(12) United States Patent
Osband et al.

(10) Patent No.: US 12,536,444 B2
(45) Date of Patent: Jan. 27, 2026

(54) SYSTEMS AND METHODS FOR PROVIDING REINFORCEMENT LEARNING IN A DEEP LEARNING SYSTEM

(71) Applicant: The Board of Trustees of the Leland Stanford Junior University, Stanford, CA (US)

(72) Inventors: Ian David Moffat Osband, Stanford, CA (US); Benjamin Van Roy, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 817 days.

(21) Appl. No.: 16/576,697

(22) Filed: Sep. 19, 2019

(65) Prior Publication Data

US 2020/0065672 A1     Feb. 27, 2020

Related U.S. Application Data

(63) Continuation of application No. 15/212,042, filed on Jul. 15, 2016, now abandoned, which is a
(Continued)

(51) Int. Cl.
*G06N 3/08*        (2023.01)
*G06N 3/044*     (2023.01)
*G06N 3/045*     (2023.01)

(52) U.S. Cl.
CPC .............. *G06N 3/08* (2013.01); *G06N 3/044* (2023.01); *G06N 3/045* (2023.01)

(58) Field of Classification Search
CPC .......... G06N 3/08; G06N 3/04; G06N 3/0454; G06N 3/0445; G06N 3/006; G06N 7/01;
(Continued)

(56) References Cited

U.S. PATENT DOCUMENTS

| 5,448,681 A | 9/1995 | Khan |
| 7,707,131 B2 | 4/2010 | Chickering et al. |

(Continued)

FOREIGN PATENT DOCUMENTS

| EP | 0462916 A2 | 12/1991 |
| WO | 2017004626 | 1/2017 |

(Continued)

OTHER PUBLICATIONS

Lizotte, Daniel J., Lacey Gunter, Eric Laber, and Susan A. Murphy. "Missing data and uncertainty in batch reinforcement learning." In Neural Information Processing Systems (NIPS). 2008. (Year: 2008).*
(Continued)

*Primary Examiner* — Michael J Huntley
(74) *Attorney, Agent, or Firm* — KPPB LLP

(57) ABSTRACT

Systems and methods for providing reinforcement learning for a deep learning network are disclosed. A reinforcement learning process that provides deep exploration is provided by a bootstrap that applied to a sample of observed and artificial data to facilitate deep exploration via a Thompson sampling approach.

18 Claims, 11 Drawing Sheets

---

IncrementalBayesBootstrapSample

Input: Data $x_1, ..., x_N \in \mathcal{X}$, weights $w_1, ..., w_{N-1} \in \mathfrak{R}_+$, function $\phi : \mathcal{P}(\mathcal{X}) \mapsto \mathcal{Y}$
Output: Sampled weight $w_N$, sampled outcome $y$ 1: sample $w_N \sim \mathrm{Exp}(1)$
2: for all $dx \subseteq \mathcal{X}$, let $\hat{P}(dx) = \sum_{n=1}^{N} w_n \mathbf{1}(x_n \in dx) / \sum_{n=1}^{N} w_n$
3: compute $y = \phi(\hat{P})$

Related U.S. Application Data continuation-in-part of application No. 15/201,284, filed on Jul. 1, 2016, now abandoned.

(60) Provisional application No. 62/187,681, filed on Jul. 1, 2015.

(58) Field of Classification Search
CPC ........ G06N 20/00; G06N 3/045; G06N 3/084; G06N 3/044; G06N 20/20; G06N 3/088; G06N 5/02; G06N 5/022; G06N 5/043; G06N 5/046; G06N 5/01; G06N 5/025; G06N 5/04; G06N 3/002; G06N 3/008; G06N 3/047; G06N 3/048; G06N 3/049; G06N 3/126; G06N 5/041; G06N 5/045; G06N 5/048

See application file for complete search history.

(56) References Cited

U.S. PATENT DOCUMENTS

| | | | |
|---|---|---|---|
| 8,943,008 | B2 | 1/2015 | Ponulak et al. |
| 2004/0093315 | A1 | 5/2004 | Carney |
| 2006/0224535 | A1 | 10/2006 | Chickering et al. |
| 2007/0011119 | A1 | 1/2007 | Thaler |
| 2010/0094786 | A1 | 4/2010 | Gupta et al. |
| 2015/0100530 | A1* | 4/2015 | Mnih et al. ............. G06N 3/08 |
| 2016/0232445 | A1 | 8/2016 | Srinivasan et al. |
| 2017/0032245 | A1 | 2/2017 | Osband et al. |

FOREIGN PATENT DOCUMENTS

| | | |
|---|---|---|
| WO | 2018083667 | 5/2018 |
| WO | 2018083669 A1 | 5/2018 |
| WO | 2018083671 A1 | 5/2018 |
| WO | 2018083672 A1 | 5/2018 |

OTHER PUBLICATIONS

Grounds, M. and Kudenko, D., 2005. Parallel reinforcement learning with linear function approximation. In Adaptive Agents and Multi-Agent Systems III. Adaptation and Multi-Agent Learning (pp. 60-74). Springer, Berlin, Heidelberg. (Year: 2005).*
Riedmiller, Martin. "Neural fitted Q iteration-first experiences with a data efficient neural reinforcement learning method." In European conference on machine learning, pp. 317-328. Springer, Berlin, Heidelberg, 2005. (Year: 2005).*
Busoniu, Lucian, Rémi Munos, Bart De Schutter, and Robert Babuška. "Optimistic planning for sparsely stochastic systems." In 2011 IEEE Symposium on Adaptive Dynamic Programming and Reinforcement Learning (ADPRL), pp. 48-55. IEEE, 2011. (Year: 2011).*
Feitelson, Dror G., Locality of Sampling and Diversity in Parallel System Workloads, 2007 (Year: 2007).*
Velez et al., Bayesian Nonparametric Methods for Partially-Observable Reinforcement Learning, 2013 (Year: 2013).*
Friston, Karl et al., Reinforcement Learning or Active Inference?, 2009 (Year: 2009).*
Azar, Mohammad et al., Minimax PAC Bounds on the Sample Complexity of Reinforcement Learning with a Generative Model, 2013 (Year: 2013).*
Monekosso et al., Synthetic Training Data Generation for Activity Monitoring and Behavior Analysis, 2009 (Year: 2009).*
Russo, Daniel et al., "Learning to Optimize Via Posterior Sampling", Stanford University, Feb. 26, 2013 (Year: 2013).*
International Preliminary Report on Patentability for International Application PCT/US2016/042631, Report issued Jan. 2, 2018, Mailed Jan. 11, 2018, 5 pgs.
International Search Report and Written Opinion for International Application No. PCT/US2016/042631, Search completed Sep. 2, 2016, Mailed Sep. 30, 2016, 6 pgs.

Abbasi-Yadkori et al., "Regret Bounds for the Adaptive Control of Linear Quadratic Systems", JMLR: Workshop and Conference Proceedings, 24th Annual Conference on Learning Theory, vol. 19, 2011, pp. 1-26.
Agrawal et al., "Further Optimal Regret Bounds for Thompson Sampling", Proceedings of the 16th International Conference on Artificial Intelligence and Statistics, Scottsdale, Arizona, Apr. 2013, pp. 99-107.
Baransi et al., "Sub-sampling for Multi-armed Bandits", Proceedings of the European Conference on Machine Learning and Knowledge Discovery in Databases, Nancy, France, Sep. 15-19, 2014, pp. 115-131.
Bellemare et al., "The arcade learning environment: An evaluation platform for general agents", Journal of Artificial Intelligence Research 47, 2013, pp. 253-279.
Bickel et al., "Some asymptotic theory for the bootstrap", The Annals of Statistics, 1981, vol. 9, No. 6, pp. 1196-1217.
Blundell et al., "Weight Uncertainty in Neural Networks", Proceedings of the 32nd International Conference on Machine Learning, 2015, vol. 27, 10 pgs.
Brafman et al., "R-MAX—A General Polynomial Time Algorithm for Near-Optimal Reinforcement Learning", Journal of Machine Learning Research, vol. 3, Oct. 2002, pp. 213-231.
Dann et al., "Sample complexity of episodic fixed-horizon reinforcement learning", Advances in Neural Information Processing Systems, 2015, pp. 1-28.
Eckles et al., "Thompson Sampling With the Online Bootstrap", arXiv preprint arXiv:1410.4009 (2014), 13 pgs.
Efron, "Bootstrap Methods: Another Look at the Jackknife", The Annals of Statistics, vol. 7, No. 1, Jan. 1979, pp. 1-26.
Efron, "The Jackknife, the Bootstrap and Other Resampling Plans", Prepared Under the Auspices of Public Health Service Grant 2 R01 GM21215-06, Technical Report No. 63, 1980, 140 pgs.
Efron et al, "An introduction to the bootstrap", CRC press, 1994, 33 pgs.
Gal et al., "Dropout as a Bayesian Approximation: Representing Model Uncertainty in Deep Learning", Proceedings of the 33rd International Conference of Machine Learning, 2016, vol. 48, 12 pgs.
Guez et al., "Efficient Bayes-Adaptive Reinforcement Learning Using Sample-Based Search", Advances in Neural Information Processing Systems, 2012, pp. 1-9.
Jaksch et al., "Near-optimal regret bounds for reinforcement learning", Journal of Machine Learning Research, vol. 11, 2010, pp. 1563-1600.
Kakade, "On the Sample Complexity of Reinforcement Learning", PhD thesis, University College London, 2003, pp. 1-133.
Lai et al., "Asymptotically efficient adaptive allocation rules", Advances in applied mathematics, vol. 6, Issue 1, 1985, pp. 4-22.
Mnih et al., "Human-level control through deep reinforcement learning", Advances in Neural Information Processing Systems, 2016, arXiv:1602.04621, Jul. 4, 2016, 18 pgs.
Osband et al, "(More) Efficient Reinforcement Learning via Posterior Sampling", NIPS, Curran Associates, Inc., 2013, 10 pgs.
Osband et al, "Deep Exploration via Bootstrapped DQN.", Advances in neural information processing systems, 2016, arXiv:1602.04621, Jul. 4, 2016, 18 pgs.
Osband et al, "Generalization and Exploration via Randomized Value Functions", arXiv preprint arXiv:1402.0635, 2014, 22 pgs.
Osband et al, "Model-Based Reinforcement Learning and the Eluder Dimension", Advances in Neural Information Processing Systems, 2014, 9 pgs.
Osband et al., "Bootstrapped Thompson Sampling and Deep Exploration", arXiv preprint arXiv:1507.00300, Jul. 2, 2015, 10 pgs.
Osband et al., "Near-optimal Regret Bounds for Reinforcement Learning in Factored MDPs", arXiv:1403.3741v1 [stat.ML], Mar. 15, 2014, 12 pgs.
Owen et al, "Bootstrapping Data Arrays of Arbitrary Order", The Annals of Applied Statistics, vol. 6, No. 3, 2012, pp. 895-927.
Rubin, "The Bayesian Bootstrap", The Annals of Statistics, vol. 9, No. 1, Jan. 1981, pp. 130-134.

(56) References Cited

OTHER PUBLICATIONS

Russo et al., "Learning to Optimize via Posterior Sampling", Mathematics of Operations Research, vol. 39, No. 4, Apr. 23, 2014, pp. 1221-1243.
Schaul et al., "Prioritized Experience Replay", arXiv preprint arXiv:1511.05952, 2015, pp. 1-21.
Srivastava et al., "Dropout: A Simple Way to Prevent Neural Networks from Overfitting", The Journal of Machine Learning Research, vol. 15, No. 1, 2014, pp. 1929-1958.
Stadie et al, "Incentivizing Exploration in Reinforcement Learning with Deep Predictive Models", arXiv preprint arXiv:1507.00814, 2015, pp. 1-11.
Strens, "A Bayesian Framework for Reinforcement Learning", Proceedings of the Seventeenth International Conference on Machine Learning, 2000, 8 pgs.
Sutton et al, "Reinforcement Learning: An Introduction", MIT Press, Mar. 1998, 445 pgs (presented in two parts).
Tesauro, "Temporal Difference Learning and TD-Gammon", Communications of the ACM, 1995, vol. 38, No. 3, 16 pgs.
Thompson, "On the Likelihood that One Unknown Probability Exceeds Another in View of the Evidence of Two Samples", Biometrika, vol. 25, No. 3/4, 1933, pp. 285-294.
Von Hasselt et al, "Deep Reinforcement Learning with Double Q-learning", arXiv preprint arXiv:1509.06461, 2015, 13 pgs.
Wang et al, "Dueling Network Architectures for Deep Reinforcement Learning", arXiv preprint arXiv:1511.06581, 2015, 15 pgs.
Wen et al, "Efficient Exploration and Value Function Generalization in Deterministic Systems", NIPS, 2013, pp. 1-9.

\* cited by examiner

Bootstrap

Input: Data $x_1, \ldots, x_N \in \mathcal{X}$, function $\phi : \mathcal{P}(\mathcal{X}) \mapsto \mathcal{Y}$, $K \in \mathbb{N}$
Output: Probability measure $\hat{P} \in \mathcal{P}(\mathcal{Y})$ 1: for $k = 1, \ldots, K$ do
2:     sample data $x_1^k, \ldots, x_N^k$ from $\{x_1, \ldots, x_N\}$ uniformly with replacement
3:     for all $dx \subset \mathcal{X}$, let $\hat{P}_k(dx) = \sum_{n=1}^{N} \mathbf{1}(x_n^k \in dx)/N$
4:     compute $y_k = \phi(\hat{P}_k)$
5: end for
6: For all $dy \in \mathcal{Y}$, let $\hat{P}(dy) = \sum_{k=1}^{K} \mathbf{1}(y_k \in dy)/K$

*FIG. 1*

BayesBootstrap

Input: Data $x_1, \ldots, x_N \in \mathcal{X}$, function $\phi : \mathcal{P}(\mathcal{X}) \mapsto \mathcal{Y}$, $K \in \mathbb{N}$

Output: Probability measure $\hat{\mathcal{P}} \in \mathcal{P}(\mathcal{Y})$ 1: for $k = 1, \ldots, K$ do
2:     sample $w_1^k, \ldots, w_N^k \sim \text{Exp}(1)$
3:     for all $dx \subseteq \mathcal{X}$, let $\hat{P}_k(dx) = \sum_{n=1}^{N} w_n^k \mathbb{1}(x_n \in dx) / \sum_{n=1}^{N} w_n^k$
4:     compute $y_k = \phi(\hat{P}_k)$
5: end for
6: For all $dy \in \mathcal{Y}$, let $\hat{\mathcal{P}}(dy) = \sum_{k=1}^{K} \mathbb{1}(y_k \in dy) / K$

*FIG. 2*

Bootstrap Thompson

Input: Bootstrap algorithm $B$, artificial history length $M$ and sampling distribution $P$ 1: $H_1 = \emptyset$
2: for $t = 1, 2, \ldots$ do
3:    Sample artificial history $\tilde{H} = ((\tilde{A}_1, \tilde{Y}_1), \ldots, (\tilde{A}_M, \tilde{Y}_M)) \sim P$
4:    Bootstrap sample $\hat{P} = B(H_t \cup \tilde{H}_t, E[\hat{p}^* | H_{t+M} = \cdot], K = 1)$
5:    Sample $\hat{p} \sim \hat{P}$
6:    Select $A_t \in \arg\max_a E[R(Y_{t,a}) | \hat{p}]$
7:    Observe $Y_{t,A_t}$
8:    Update $H_{t+1} = H_t \cup (A_t, Y_{t,A_t})$
9: end for

FIG. 3

Reinforcement Learning with Bootstrapped Value Function Randomization

1: Input: Bootstrap algorithm $B$, value function approximator $\phi$, number of artificial episodes $M$, sampling distribution $\mathcal{P}$
2: $H = ()$
3: for episode $l = 1, 2, \ldots$ do
4:     Sample $\tilde{H} = ((\tilde{s}_{1,1}, \tilde{a}_{1,1}, \tilde{r}_{1,1}, \ldots, \tilde{s}_{1,\tau}, \tilde{a}_{1,\tau}, \tilde{r}_{1,\tau}), \ldots, (\tilde{s}_{M,1}, \tilde{a}_{M,1}, \tilde{r}_{M,1}, \ldots, \tilde{s}_{M,\tau}, \tilde{a}_{M,\tau}, \tilde{r}_{M,\tau})) \sim \mathcal{P}$
5:     Bootstrap sample $\hat{\mathcal{P}} \leftarrow B(\tilde{H} \cup H, \phi, K = 1)$
6:     Sample $Q_\ell \sim \hat{\mathcal{P}}$
7:     for time $t = 1, \ldots, \tau$ do
8:         Select action $a_{l,t} \in \arg\max_a Q_\ell(s_{l,t}, a)$
9:         Observe reward $r_{l,t}$, transition to $s_{l,t+1}$
10:     end for
11:     Update $H \leftarrow H \cup (s_{l,1}, a_{l,1}, r_{l,1}, \ldots, s_{l,\tau}, a_{l,\tau}, r_{l,\tau})$
12: end for

*FIG. 5*

IncrementalBayesBootstrapSample

Input: Data $x_1, \ldots, x_N \in \mathcal{X}$, weights $w_1, \ldots, w_{N-1} \in \mathbb{R}_+$, function $\phi : \mathcal{P}(\mathcal{X}) \mapsto \mathcal{Y}$
Output: Sampled weight $w_N$, sampled outcome $y$ 1: sample $w_N \sim \text{Exp}(1)$
2: for all $dx \subseteq \mathcal{X}$, let $\hat{P}(dx) = \sum_{n=1}^{N} w_n \mathbf{1}(x_n \in dx) / \sum_{n=1}^{N} w_n$
3: compute $y = \phi(\hat{P})$

FIG. 6

Incremental Reinforcement Learning with Bootstrapped Value Function Randomization 1: Input: Incremental bootstrap algorithm $B$, value function approximator $\phi$,
2: number of models $K$, initial models $Q^1, \ldots, Q^K$
3: number of artificial episodes $M$, sampling distribution $p$
4: Parfor bootstrap sample $k = 1, \ldots, K$
5: $\quad H^k = ()$
6: $\quad$ Sample $\tilde{H}^k = ((\tilde{s}^k_{1,1}, \tilde{a}^k_{1,1}, \tilde{r}^k_{1,1}, \ldots, \tilde{s}^k_{1,T}, \tilde{a}^k_{1,T}, \tilde{r}^k_{1,T}), \ldots, (\tilde{s}^k_{M,1}, \tilde{a}^k_{M,1}, \tilde{r}^k_{M,1}, \ldots, \tilde{s}^k_{M,T}, \tilde{a}^k_{M,T}, \tilde{r}^k_{M,T})) \sim p$
7: EndParfor
8: for episode $l = 1, 2, \ldots$ do
9: $\quad$ Parfor bootstrap sample $k = 1, \ldots, K$
10: $\quad\quad$ Bootstrap Sample $Q^k_l \leftarrow B(\tilde{H}^k \cup H^k, \phi, Q^k)$
11: $\quad$ EndParfor
12: $\quad$ Sample $k \sim \text{unif}(1, \ldots, K)$
13: $\quad$ for time $t = 1, \ldots, T$ do
14: $\quad\quad$ Select action $a_{l,t} \in \arg\max_\alpha Q^k_l(s_{l,t}, \alpha)$
15: $\quad\quad$ Observe reward $r_{l,t}$, transition to $s_{l,t+1}$
16: $\quad$ end for
17: $\quad$ Parfor bootstrap sample $k = 1, \ldots, K$
18: $\quad\quad$ Update $H^k \leftarrow H^k \cup (s_{l,1}, a_{l,1}, r_{l,1}, \ldots, s_{l,T}, a_{l,T}, r_{l,T})$
19: $\quad$ EndParfor
20: end for

*FIG. 7*

SYSTEMS AND METHODS FOR PROVIDING REINFORCEMENT LEARNING IN A DEEP LEARNING SYSTEM

CROSS-REFERENCE TO RELATED APPLICATIONS

The current application is a Continuation of U.S. patent application Ser. No. 15/212,042 filed Jul. 15, 2016, which is a Continuation-In-Part Application of U.S. patent application Ser. No. 15/201,284 filed Jul. 1, 2016 that in turn claims priority to U.S. Provisional Application No. 62/187,681, filed Jul. 1, 2015, the disclosures of which are incorporated herein by reference as set forth herewith.

FIELD OF THE INVENTION

This invention relates to deep learning networks including, but not limited to, artificial neural networks. More particularly, this invention relates to systems and methods for training deep learning networks from a set of training data using reinforcement learning.

BACKGROUND OF THE INVENTION

Deep learning networks including, but not limited to, artificial neural networks are machine learning systems that receive data, extract statistics and classify results. These systems use a training set of data to generate a model in order to make data driven decisions to provide a desired output.

Deep learning networks are often used to solve problems in an unknown environment where the training dataset is used to ascertain the extent of the environment. One manner of training a deep learning network is referred to as reinforcement learning in which the system takes a sequence of actions in order to maximize cumulative rewards. In reinforcement learning, the system begins with an imperfect knowledge of the environment and learns through experience. As such, there is a fundamental trade-off between exploration and exploitation in that the system may improve its future rewards by exploring poorly understood states and actions and sacrificing immediate rewards.

Many approaches to reinforcement learning have been put forth. Most of the proposed approaches are designed based upon Markov Decision Processes (MDPs) with small finite state spaces. Some other approaches require solving computationally intractable planning tasks. These approaches are not practical in complex environments that require the system to generalize in order to operate properly. Thus, these reinforcement learning approaches in large-scale application have relied upon either statistically inefficient exploration strategies or include no exploration at all.

Some other common exploration approaches are dithering strategies. An example of a dithering strategy is a &greedy. In common dithering strategies, the approximated value of an action is a single value and the system picks the action with the highest value. In some strategies, the system may also choose some actions at random. Another common exploration strategy is inspired by Thompson sampling. In a Thompson sampling strategy, there is some notion of uncertainty. However, a distribution of the possible values from the dataset and the system is explored by randomly selecting a policy according to the probability that the selected policy is the optimal policy.

SUMMARY

The above and other problems are solved and an advance in the art is made by systems and methods for providing reinforcement learning in deep learning networks in accordance with some embodiments of the invention. Reinforcement learning with deep exploration is provided in the following manner in accordance with some embodiments of the invention. A deep neural network is maintained. A reinforcement learning process is applied to the deep neural network.

The reinforcement learning process is performed in the following manner in accordance with some embodiments. A set of observed data and a set artificial data is received. For each of a number of episodes, the process samples a set of data that is a union of the set of observed data and the set of artificial data to generate set of training data. A state-action value function is then determined for the set of training data using a bootstrap process and an approximator. The approximator estimates a state-action function for a dataset. For each time step in each of the one or more episodes, the process determines a state of the system for a current time step from the set of training data. An action based on the determined state of the system and a policy mapping actions to the state of the system is selected by the process and results for the action including a reward and a transition state that result from the selected action are determined. Result data from the current time step that includes the state, the action, the transition state are stored. The set of the observed data is then updated with the result data from at least one time step of an episode at the conclusion of an episode.

In accordance with some embodiments, the reinforcement learning process generates the set of artificial data from the set of observed data. In accordance with many of these embodiments the artificial data is generated by sampling the set of observed data with replacement to generate the set of artificial data. In accordance with a number of other embodiments, the artificial data is generated by sampling state-action pairs from a diffusely mixed generative model and assigning each of the sampled state-action pairs stochastically optimistic rewards and random state transitions.

In accordance with some embodiments, the reinforcement learning process maintains a training mask that indicates the result data from each of the time period in each episode to be used in training and updates the set of observed data by adding the result data from each time period of an episode indicated in the training mask.

In accordance with some embodiments, the approximator can be received as an input. In accordance with many embodiments, the approximator is read from memory. In accordance with a number of embodiments, the approximator is a neural network trained to fit a state-action value function to the data set via a least squared iteration.

In accordance with some embodiments, one or more reinforcement learning processes are applied to the deep neural network. In accordance with many of these embodiments, each of the reinforcement learning processes independently maintains a set of observed data. In accordance with some other embodiments, the reinforcement learning processes cooperatively maintain the set of observed data. In accordance with some of these embodiments, a bootstrap mask that indicates each element in the set of observed data that is available to each of the reinforcement learning processes is maintained.

BRIEF DESCRIPTION OF THE DRAWINGS

FIG. 1 illustrates a process for a bootstrap method in accordance with an embodiment of the invention.

FIG. 2 illustrates a process for a Bayesian bootstrap method in accordance with an embodiment of the invention.

FIG. 3 illustrates a bootstrapped Thompson sampling process in accordance with an embodiment of the invention.

FIG. 5 illustrates a process for reinforcement learning with bootstrapped value function randomization in accordance with an embodiment of the invention.

FIG. 6 illustrates a process for incremental fitting by leveraging parallel computation in accordance with an embodiment of the invention.

FIG. 7 illustrates a process for incremental fitting by leveraging parallel computation in accordance with an embodiment of the invention.

DETAILED DISCUSSION

Figure 4:
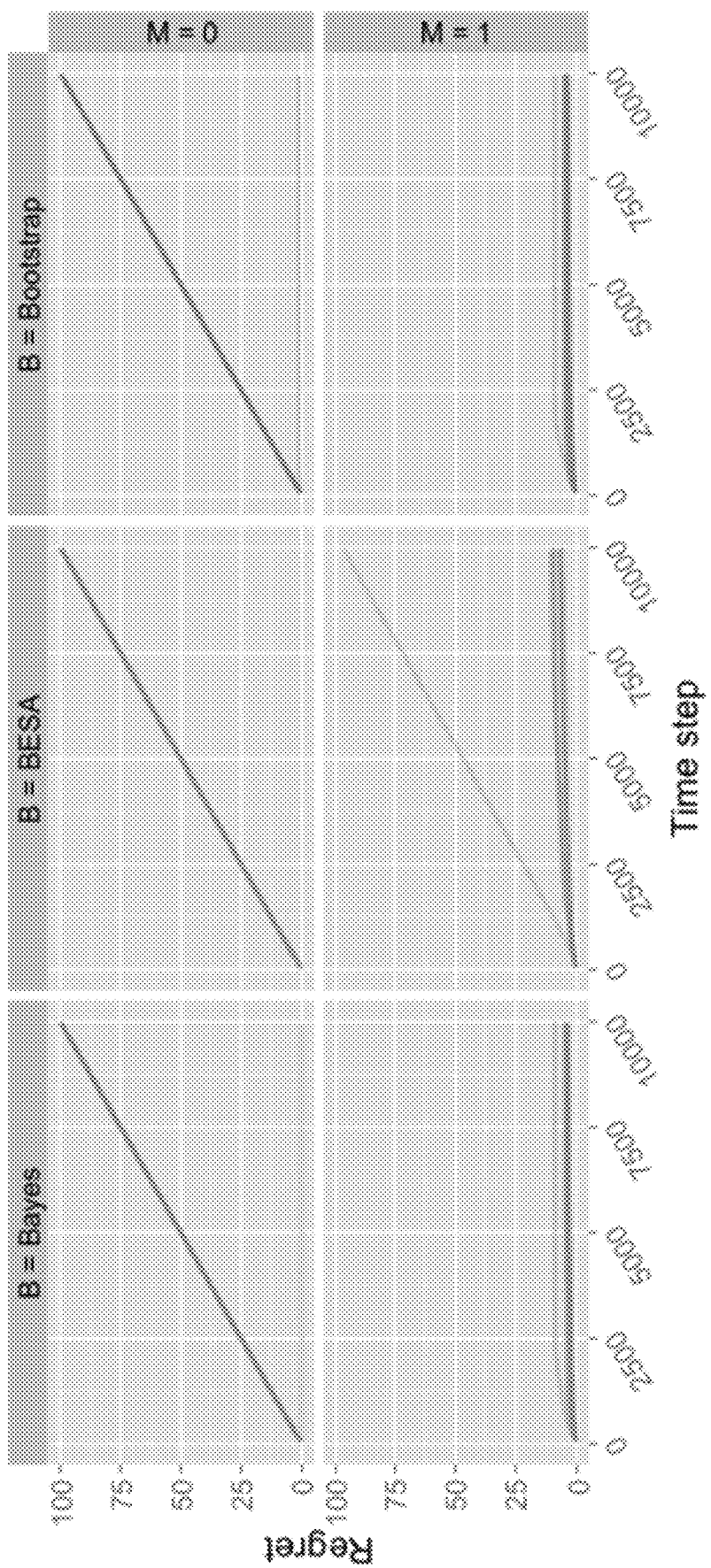
FIG. 4 illustrates plots for different variants of bootstrapped Thompson sampling in accordance with an embodiment of the invention.

Turning now to the drawings, systems and methods for providing reinforcement learning to a deep learning network in accordance with various embodiment of the invention are disclosed. For purposes of this discussion, deep learning networks are machine learning systems that use a dataset of observed data to learn how to solve a problem in a system where all of the states of the system, actions based upon states, and/or the resulting transitions are not fully known. Examples of deep learning networks include, but are not limited to, deep neural networks.

System and methods in accordance with some embodiments of this invention that provide reinforcement learning do so by providing an exploration process for a deep learning network to solve a problem in an environment. In reinforcement learning, actions taken by a system may impose delayed consequences. Thus, the design of exploration strategies is more difficult than systems that are action-response systems where there are no delayed consequences such as multi-armed bandit problems because the system must establish a context. An example of a system that has delayed consequences is a system that interacts with an environment over repeated episodes, I, of length τ. In each time step, t=1, . . . τ, of an episode, the system observes a state of the environment, $i_{It}$, and selects an action, $a_{It}$, according to a policy π which maps the states to actions. A reward, $r_{It}$, and a state transition to state, $s_{It+1}$, are realized in response to the action. The goal of the system during exploration is to maximize the long-term sum of the expected rewards even though the system is unsure of the dynamics of the environment and the reward structure.

To perform well in a sequential decision task while learning about its environment, an agent must balance between exploitation, making good decisions given available data, and exploration, taking actions that may help to improve the quality of future decisions. Upper-confidence bound approaches offer one popular class of exploration heuristics that come with performance guarantees. Such approaches assign to poorly-understood actions high but statistically plausible values, effectively allocating an optimism bonus to incentivize exploration of each such action. However, designing, tuning, and applying such algorithms can be challenging or intractable, and as such, upper-confidence bound algorithms applied in practice often suffer poor empirical performance.

Another popular heuristic, which on the surface appears unrelated, is called Thompson sampling or probability matching. In this algorithm the agent maintains a posterior distribution of beliefs and, in each time period, samples an action randomly according to the probability that it is optimal. Although this algorithm is one of the oldest recorded exploration heuristics, it received relatively little attention until recently when its strong empirical performance was noted, and a host of analytic guarantees followed. It turns out that there is a deep connection between Thompson sampling and optimistic algorithms; in particular, Thompson sampling can be viewed as a randomized approximation that approaches the performance of a well-designed and well-tuned upper confidence bound algorithm.

Almost all of the literature on Thompson sampling takes the ability to sample from a posterior distribution as given. For many commonly used distributions, this is served through conjugate updates or Markov chain Monte Carlo methods. However, such methods do not adequately accommodate contexts in which models are nonlinearly parameterized in potentially complex ways, as is the case in deep learning. We introduce an alternative approach to tractably attain the behavior of Thompson sampling in a manner that accommodates such nonlinearly parameterized models and, in fact, may offer advantages more broadly when it comes to efficiently implementing and applying Thompson sampling.

The approach we propose is based on a bootstrap technique that uses a combination of observed and artificially generated data. The idea of using the bootstrap to approximate a posterior distribution is not new, and has been noted from inception of the bootstrap concept. Further, the application of the bootstrap and other related sub-sampling approaches to approximate Thompson sampling is not new. However, we show that these existing approaches fail to ensure sufficient exploration for effective performance in sequential decision problems. As we will demonstrate, the way in which we generate and use artificial data is critical. The approach is particularly well-suited for contexts in which exploration is coupled with deep learning, since in such settings, maintaining or generating samples from a posterior distribution becomes computationally infeasible. Further, our approach is parallelizable and as such scales well to massive complex problems. We explain how the approach can be applied to multi-armed bandit and reinforcement learning problems and how it relates to Thompson sampling.

The term bootstrap refers to a class of methods for nonparametric estimation from data-driven simulation. In essence, the bootstrap uses the empirical distribution of a sampled dataset as an estimate of the population statistic. FIG. 1 provides pseudocode for what is perhaps the most common form of bootstrap. We use P(X) to denote the set of probability measures over a set X.

The procedure of FIG. 1 allows estimates of the distribution of any unknown parameter in a non-parametric manner. The procedure of FIG. 1 easily specializes to familiar concrete versions. For example, suppose ϕ is the expectation operator. Then, each sample $y_k$ is the mean of a sample of the data set, and $\hat{P}$ is the relative frequency measure of these sample means.

The output $\hat{P}$ is reminiscent of a Bayesian posterior with an extremely weak prior. For the Bayesian bootstrap as illustrated in FIG. 2, the distribution produced can be interpreted as a posterior based on the data and a degenerate Dirichlet prior.

With the bootstrap approaches we have described, the support of distributions $\hat{P}_k$ is restricted to the dataset $\{x_1, \ldots, x_N\}$. We will show that in sequential decision problems this poses a significant problem. To address the problem, we propose a simple extension to the bootstrap. In particular, we augment the dataset $\{x_1, \ldots, x_N\}$ with artificially generated samples $\{x_{N+1}, \ldots, x_{N+M}\}$ and apply the bootstrap to the combined dataset. The artificially generated data can be viewed as inducing a prior distribution. In fact, if X is finite and $\{x_{N+1}, \ldots, x_{N+M}\} = X$, then as K grows, the distribution $\hat{P}$ produced by the Bayesian bootstrap converges to the posterior distribution conditioned on $\{x_1, \ldots, x_N\}$, given a uniform Dirichlet prior.

When the set X is large or infinite, the idea of generating one artificial sample per element does not scale gracefully. If we require one prior observation for every single possible value then the observed data $\{x_1, \ldots, x_N\}$ will bear little influence on the distribution $\hat{P}$ relative to the artificial data $\{x_{N+1}, \ldots, x_{N+M}\}$. To address this, for a selected value of M, we sample the M artificial data points $x_{N+1}, \ldots, X_{N+M}$ from a "prior" distribution $P_0$. The important thing here is that the relative strength M/N of the induced prior can be controlled in an explicit manner. Similarly, depending on the choice of the prior sampling distribution $P_0$ the posterior is no longer restricted to finite support. In many ways this extension corresponds to using a Dirichlet process prior with generator $P_0$.

This augmented bootstrap procedure is especially promising for nonlinear functions such as deep neural networks, where sampling from a posterior is typically intractable. In fact, given any method of training a neural network on a dataset of size N, we can generate an approximate posterior through K bootstrapped versions of the neural network. In its most naive implementation this increases the computational cost by a factor of K. However, this approach is parallelizable and therefore scalable with compute power. In addition, it may be possible to significantly reduce the computational cost of this bootstrap procedure by sharing some of the lower-level features between bootstrap sampled networks or growing them out in a tree structure. This could even be implemented on a single chip through a specially constructed dropout mask for each bootstrap sample. With a deep neural network this could provide significant savings.

Multi-Armed Bandit

Consider a problem in which an agent sequentially chooses actions $(A_t: t \in \mathbb{N})$ from an action set A and observes corresponding outcomes $(Y_{t,A_t}: t \in \mathbb{N})$. There is a random outcome $Y_{t,A_t} \in Y$ associated with each $\alpha \in A$ and time $t \in \mathbb{N}$. For each random outcome the agent receives a reward $R(Y_{t,a})$ where $R: Y \mapsto \mathbb{R}$ is a known function. The "true outcome distribution" p* is itself drawn from a family of distributions P. We assume that, conditioned on p*, $(Y_t: t \in \mathbb{N})$ is an iid sequence with each element $Y_t$ distributed according to p*. Let $p_a^*$ be the marginal distribution corresponding to $Y_{t,a}$. The T-period regret of the sequence of actions $A_1, \ldots, A_T$ is the random variable $$\text{Regret}(T, p^*) = \sum_{t=1}^{T} \mathbb{E}\left[\max_a R(Y_{t,a}) - R(Y_{t,A_t}) | p^*\right]$$

The Bayesian regret to time T is defined by $\text{BayesRegret}(T) = \mathbb{E}[\text{Regret}(T, p^*)]$, where the expectation is taken with respect to the prior distribution over p*.

We take all random variables to be defined with respect to a probability space $(\Omega, F, \mathbb{P})$. We will denote by $H_t$ the history of observations $(A_1, Y_{1, A_1}, \ldots, A_{t-1}, Y_{t-1, A_{t-1}})$ realized prior to time t. Each action $A_t$ is selected based only on $H_t$ and possibly some external source of randomness. To represent this external source, we introduce a sequence of iid random variables $(U_t: t \in \mathbb{N})$. Each action $A_t$ is measurable with respect to the sigma-algebra generated by $(H_t, U_t)$.

The objective is to choose actions in a manner that minimizes Bayesian regret. For this purpose, it is useful to think of actions as being selected by a randomized policy $\pi = (\pi_t: t \in \mathbb{N})$, where each in is a distribution over actions and is measurable with respect to the sigma-algebra generated by $H_t$. An action $A_t$ is chosen at time t by randomizing according to $\pi_t(\cdot) = \mathbb{P}(A_t \in \cdot | H_t)$. Our bootstrapped Thompson sampling, presented in FIG. 3, serves as such a policy. The algorithm uses a bootstrap algorithm, like those described with reference to FIGS. 1 and 2, as a subroutine. Note that the sequence of action-observation pairs is not iid, though bootstrap algorithms effectively treat data passed to them as iid. The function $\mathbb{E}[p^* | H_{t+m} = \cdot]$ passed to the bootstrap algorithm maps a specified history of t+M action-observation pairs to a probability distribution over reward vectors. The resulting probability distribution can be thought of as a model fit to the data provided in the history. Note that the algorithm takes as input a distribution $\tilde{P}$ from which artificial samples are drawn. This can be thought of as a subroutine that generates M action-observation pairs. As a special case, this subroutine could generate M deterministic pairs. There can be advantages, though, to using a stochastic sampling routine, especially when the space of action-observation pairs is large and we do not want to impose too strong a prior.

The process illustrated in FIG. 3 is similar to Thompson sampling, though the posterior sampling step has been replaced by a single bootstrap sample. For several multi-armed bandit problems BootstrapThompson with appropriate artificial data is equivalent to Thompson sampling.

One drawback of the process illustrated in FIG. 3 is that the computational cost per timestep grows with the amount of data $H_t$. For applications at large scale this will be prohibitive. Fortunately there is an effective method to approximate these bootstrap samples in an online manner at constant computational cost. Instead of generating a new bootstrap sample every step we can approximate the bootstrap bootstrap distribution by training $D \in \mathbb{N}$ online bootstrap models in parallel and then sampling between them uniformly. In its most naive implementation this parrallel bootstrap will have a computational cost per timestep D times larger than a greedy algorithm. However, for specific function classes such as neural networks it may be possible to share some computation between models and provide significant savings.

We now examine a simple problem instance designed to demonstrate the need for an artificial history to incentivize efficient exploration in BootstrapThompson. The action space $A = \{1, 2\}$, outcomes $Y = [0, 1]$ and rewards $R(y) = y$. We fix $0 < \epsilon < < 1$ and describe the true underlying distribution in terms of the Dirac delta function $\delta_x(y)$ which assigns all probability mass to x:

$$p_a^*(y) = \begin{cases} \delta_\epsilon(y) & \text{if } a = 1 \\ (1 - 2\epsilon)\delta_0(y) + 2\epsilon\delta_1(y) & \text{if } a = 2 \end{cases}$$

The optimal policy is to pick a=2 at every timestep, since this has an expected reward of 2$\epsilon$ instead of just $\epsilon$. However, with probability at least 1-2$\epsilon$, BootstrapThompson without artificial history (M=0) will never learn the optimal policy.

To see why this is the case, note that BootstrapThompson without artificial history must begin by sampling each arm once. In our system this means that with probability 1-2$\epsilon$ the agent will receive a reward of $\epsilon$ from arm one and 0 from arm two. Given this history, the algorithm will prefer to choose arm one for all subsequent timesteps, since its bootstrap estimates will always put all their mass on $\epsilon$ and 0 respectively. However, we show that this failing can easily be remedied by the inclusion of some artificial history.

In FIG. 4, we plot the cumulative regret of three variants of BootstrapThompson using different bootstrap algorithms with M=0 or M=2. For our simulations we set $\epsilon$=0.01 and ran 20 Monte Carlo simulations for each variant of the algorithm. In each simulation and each time period, the pair of artificial data points for cases with M=2 was sampled from a distribution $\tilde{P}$ that selects each of the two actions once and samples an observation uniformly from [0, 1] for each. We found that, in this example, the choice of bootstrap method makes little difference but that injecting artificial data is crucial to incentivizing efficient exploration.

The six subplots in FIG. 4 present results differentiated by choice of bootstrap algorithms and whether or not to include artificial data. The columns indicate which bootstrap algorithm is used with labels "Bootstrap" for a process like that described in FIG. 1, "Bayes" for a process like that described in FIG. 2, and "BESA" for a recently proposed bootstrap approach. The BESA algorithm is a variant of the bootstrap that applies to two armed bandit problems. In each time period, the algorithm estimates the reward of each arm by drawing a sample average (with replacement) with sample size equal to the number of times the other arm has been played.

The rows indicate whether or not artificial prior data was used. We see that BootstrapThompson generally fails to learn with M=0, however the inclusion of artificial data helps to drive efficient exploration. The choice of bootstrap algorithm B seems to make relatively little difference, however we do find that Bootstrap and Bayes seem to outperform BESA on this example.

The BootstrapThompson algorithm is similar to Thompson sampling, the only difference being that a draw from the posterior distribution is replaced by a bootstrap sample. In fact, we can show that, for particular choices of bootstrap algorithm and artificial data distribution, the two algorithms are equivalent.

Consider as an example a multi-armed bandit problem with independent arms, for which each ath arm generates rewards from a Bernoulli distribution with mean $\theta_a$. Suppose that our prior distribution over $\theta_a$ is Beta($\alpha_a,\beta_a$). Then, the posterior conditioned on observing $n_{a0}$ outcomes with reward zero and $n_{a1}$ outcomes with reward one is Beta($\alpha_a+n_{a0},\beta_a+n_{a1}$). If $\alpha_a$ and $\beta_a$ are positive integers, a sample $\theta_a$ from this distribution can be generated by the following procedure: sample $x_1, \ldots, x_{\alpha_a+n_{a1}}, y_1, \ldots, y_{\beta_a+n_{a2}} \sim$ Exp (1) and let $\theta a=\Sigma_i x_i/(\Sigma_i x_i+\Sigma_j y_j)$. This sampling procedure is identical to the procedure described with reference to FIG. 2, with artificial data generated by a distribution $\tilde{P}$ that assigns all probability to a single outcome that, for each arm a, produces $\alpha_a+\beta_a$ data samples, with $\alpha_a$ of them associated with reward one and $\beta_a$ of them associated with reward 0.

The example we have presented can easily be generalized to the case where each arm generates rewards from among a finite set of possibilities with probabilities distributed according to a Dirichlet prior. We expect that, with appropriately designed schemes for generating artificial data, such equivalences can also be established for a far broader range of problems.

The aforementioned equivalencies imply that theoretical regret bounds previously developed for Thompson sampling apply to the BootstrapThompson algorithm with the Bayesian bootstrap and appropriately generated artificial data.

Reinforcement Learning

Reinforcement learning is a deep learning approach that differs from standard supervised learning in that correct input/output pairs are never presented, nor sub-optimal actions explicitly corrected. Further, there is a focus on on-line performance, which involves finding a balance between exploration (of uncharted territory) and exploitation (of current knowledge).

In reinforcement learning, actions taken by the agent can impose delayed consequences. This makes the design of exploration strategies more challenging than for multi-armed bandit problems. To fix a context, consider an agent that interacts with an environment over repeated episodes of length $\pi$. In each time period t=1, . . . , $\pi$ of each episode l=1, 2, . . . , the agent observes a state $s_{lt}$ and selects an action $a_{lt}$ according to a policy $\pi$ which maps states to actions. A reward of $r_{lt}$ and state transition to $s_{lt+1}$ are then realized. The agent's goal is to maximize the long term sum of expected rewards, even though she is initially unsure of the system dynamics and reward structure.

A common approach to reinforcement learning involves learning a state-action value function, Q, which for time, t, state, s, and action, a, provides an estimate, $Q_t(s,a)$, of expected rewards over the remainder of the episode: $r_{l,t}+r_{l,t+1}+ \ldots +r_{l,\pi}$. Given a state-action value function, Q, the system selects an action that maximizes $Q_t(s,a)$ when at state s and time t. Most reinforcement learning systems provide an exploration strategy that balances exploration with exploitation. However, the vast majority of these processes operate in a "tabula rasa" setting which does not allow for generalization between state-action pairs which is needed in systems having a large number of states and actions.

Some of the most successful applications of reinforcement learning generalize using nonlinearly parameterized models, like deep neural networks, that approximate the state-action value function. These algorithms have attained superhuman performance and generated excitement for a new wave of artificial intelligence, but still fail at simple tasks that require efficient exploration since they use simple exploration schemes that do not adequately account for the possibility of delayed consequences. Recent research has shown how to combine efficient generalization and exploration via randomized linearly parameterized value functions. Some approaches can be viewed as a variant of Thompson sampling applied in a reinforcement learning context. But such approaches do not serve the needs of nonlinear parameterizations. A version of Thompson sampling that serves such needs via leveraging the bootstrap and artificial data is illustrated in FIG. 5.

Before the beginning of each episode, the algorithm applies cp to generate a randomized state-action value function. The agent then follows the greedy policy with respect to that sample over the entire episode. As is more broadly the case with Thompson sampling, the algorithm balances exploration with exploitation through the randomness of these samples. The algorithm enjoys the benefits of what we call deep exploration in that it sometimes selects actions which are neither exploitative nor informative in themselves, but that are oriented toward positioning the agent to gain useful information downstream in the episode. In fact, the general approach represented by this algorithm may be the only known computationally efficient means of achieving deep exploration with nonlinearly parameterized representations such as deep neural networks.

As discussed earlier, the inclusion of an artificial history can be crucial to incentivize proper exploration in multi-armed bandit problems. The same is true for reinforcement learning. One simple approach to generating artificial data that accomplishes this in the context of a process such as that described in FIG. 5, is to sample state-action pairs from a diffusely mixed generative model and assign them stochastically optimistic rewards and random state transitions. When prior data is available from episodes of experience with actions selected by an expert agent, one can also augment this artificial data with that history of experience. This offers a means of incorporating apprenticeship learning as a springboard for the learning process.

Fitting a model like a deep neural network can itself be a computationally expensive task. As such it is desirable to use incremental methods that incorporate new data samples into the fitting process as they appear, without having to refit the model from scratch. It is important to observe that a slight variation of the process described in FIG. 5 accommodates this sort of incremental fitting by leveraging parallel computation. This variation is presented in FIGS. 6 and 7. The process makes use of an incremental model learning method $\phi$, which takes as input a current model, previous data set, and new data point, with a weight assigned to each data point. The process of FIG. 7 maintains $\kappa$ models (for example, $\kappa$ deep neural networks), incrementally updating each in parallel after observing each episode. The model used to guide action in an episode is sampled uniformly from the set of $\kappa$. It is worth noting that this is akin to training each model using experience replay, but with past experiences weighted randomly to induce exploration.

A reinforcement learning system in accordance with embodiments of this invention overcomes these problems by providing an exploration strategy that combines efficient generalization and exploration via leveraging a bootstrap process and artificial data. In accordance with some embodiments of the invention, the system receives a set of training data that includes observed data and artificial data. The latter serves to induce a prior distribution which, as we will demonstrate, is critical to effective exploration. In accordance with some embodiments, the artificial data is generated by sample state-action pairs from a diffusely mixed generative model and assign each state-action pair stochastically optimistic rewards and random state transitions. In accordance with some other embodiments, the artificial data is generated by sampling a set of observed data with replacement to obtain a set of data having a number of elements that is approximately equal to or greater than the number of elements as the set of observed data.

The observed and artificial data are sampled to obtain a training sample set of data. In accordance with some of these embodiments, the training sample dataset includes M samples of data. In accordance with a number of these embodiments, M is equal to or greater than a number of episodes to observe during an exploration process. In accordance with some embodiments, the sampling is performed in accordance with a known and/or a provided distribution. A bootstrap process is applied to the union of the observed data and the artificial data to obtain a new distribution for the sample of data. An approximator function is applied to the new distribution to generate a randomized state-value function.

For each episode, the process observes a state of the system, $s_{it}$, for a particular time period from the training sample dataset and selects an action to perform based upon policy $\pi$. The results including a reward, $r_{it}$, realized and a resulting transition state, $s_{it+1}$ resulting from the action are observed. The state, action, reward and transition state are stored as result data for the episode. This is repeated for each time step in the episode. After the episode is completed, the observed dataset is updated with the result data stored during the episode. In accordance with some embodiments, a training mask may be maintained that includes flags indicating the result data from particular time steps is to be used for training. The training mask is then read to determine the result data to add to the observed data.

In accordance with many embodiments, multiple exploration processes may be performed concurrently. In accordance with a number of these embodiments, the result data observed from each exploration process is shared with other exploration processes. In accordance with a number of embodiments, the observed dataset for each process is updated independently. In accordance with some of these embodiments, a boot strap mask is maintained that indicates which elements of the observed dataset are available to each process.

Systems and method for providing reinforcement learning in a deep learning network in accordance with some embodiments of the invention are set forth below with reference to the Figures.

Systems that Provide Deep Learning Neworks

Figure 8:
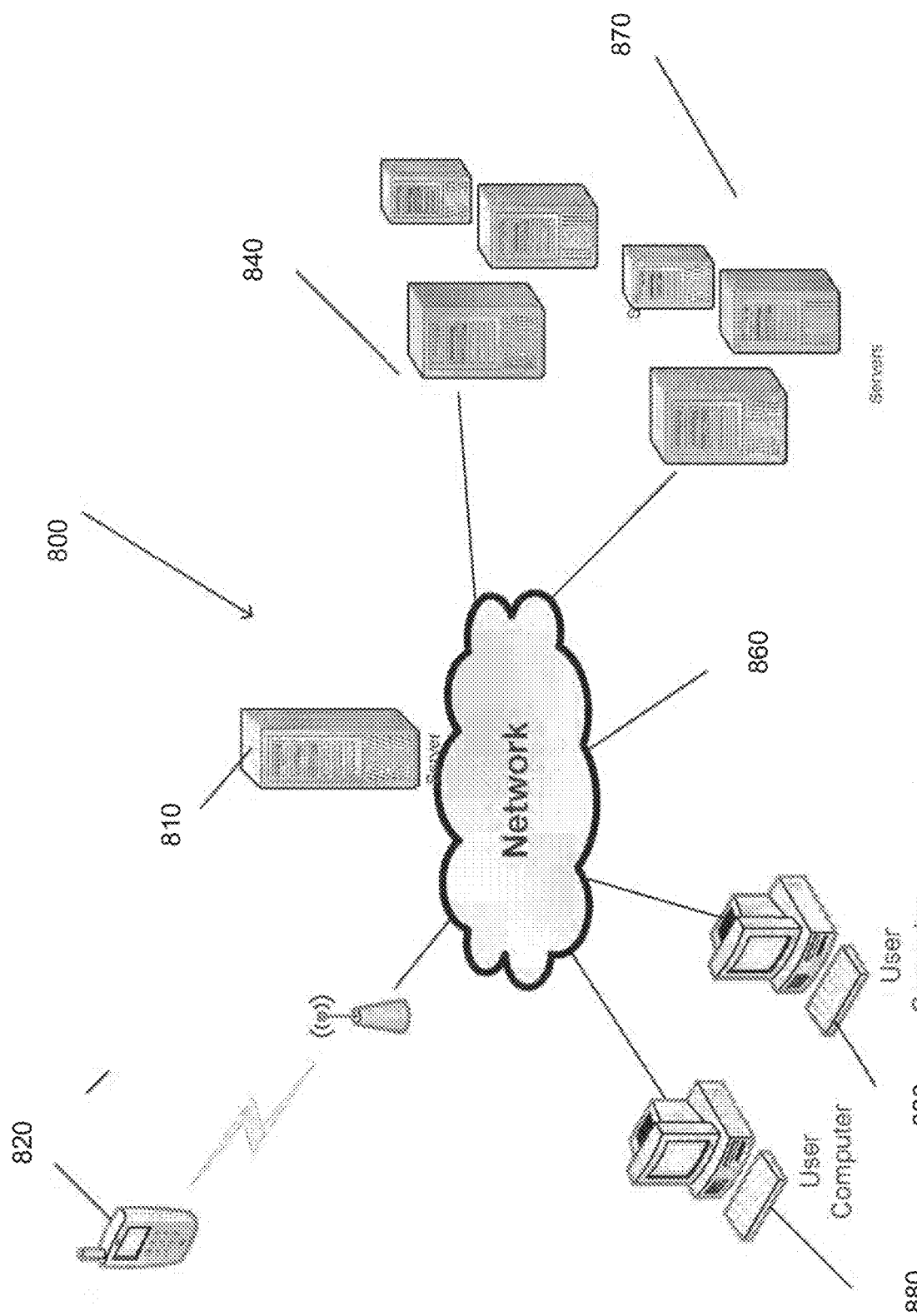
FIG. 8 illustrates various devices in a network that perform processes that systems and methods for providing reinforcement learning in a deep learning network in accordance with various embodiments of the invention.

A system that provides a deep learning system that uses systems and methods that provide reinforcement learning in accordance with some embodiments of the invention is shown in FIG. 8. Network 800 includes a communications network 860. The communications network 860 is a network such as the Internet that allows devices connected to the network 860 to communicate with other connected devices. Server systems 810, 840, and 870 are connected to the network 860. Each of the server system 810, 840, and 870 is a group of one or more servers communicatively connected to one another via internal networks that execute processes that provide cloud services to users over the network 860. For purposes of this discussion, cloud services are one or more applications that are executed by one or more server systems to provide data and/or executable applications to devices over a network. The server systems 810, 840, and 870 are shown each having three servers in the internal network. However, the server systems 810, 840 and 870 may include any number of servers and any additional number of server systems may be connected to the network 860 to provide cloud services. In accordance with various embodiments of this invention, a deep learning network that uses systems and methods that provide reinforcement learning in accordance with an embodiment of the invention may be provided by process being executed on a single server system and/or a group of server systems communicating over network 860.

Users may use personal devices 880 and 820 that connect to the network 860 to perform processes for providing and/or interaction with a deep learning network that uses systems and methods that provide reinforcement learning in accordance with various embodiments of the invention. In the shown embodiment, the personal devices 880 are shown as desktop computers that are connected via a conventional "wired" connection to the network 860. However, the personal device 880 may be a desktop computer, a laptop computer, a smart television, an entertainment gaming console, or any other device that connects to the network 860 via a "wired" connection. The mobile device 820 connects to network 860 using a wireless connection. A wireless connection is a connection that uses Radio Frequency (RF) signals, Infrared signals, or any other form of wireless signaling to connect to the network 860. In FIG. 8, the mobile device 820 is a mobile telephone. However, mobile device 820 may be a mobile phone, Personal Digital Assistant (PDA), a tablet, a smartphone, or any other type of device that connects to network 860 via wireless connection without departing from this invention.

Example of a Processing System

Figure 9:
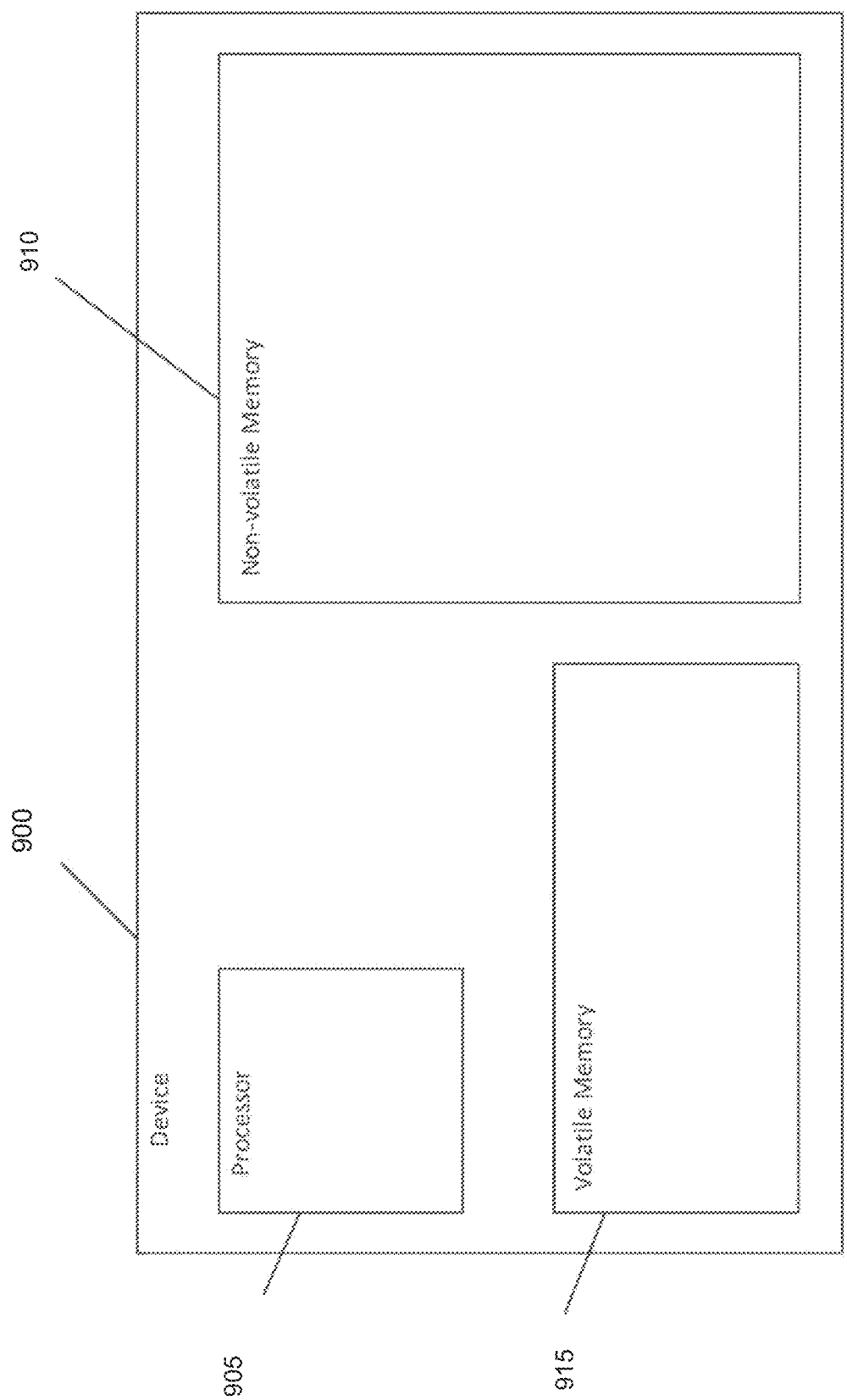
FIG. 9 illustrates a processing system in a device that performs processes that provide systems and methods for providing reinforcement learning in a deep learning network in accordance with various embodiments of the invention.

An example of a processing system in a device that executes instructions to perform processes that provide interact with other devices connected to the network as shown in FIG. 8 to provide a deep learning network that uses systems and methods that provide reinforcement learning in accordance with various embodiments of the invention in accordance with various embodiments of this invention is shown in FIG. 9. One skilled in the art will recognize that a particular processing system may include other components that are omitted for brevity without departing from this invention. The processing device 900 includes a processor 905, a non-volatile memory 910, and a volatile memory 915. The processor 905 is a processor, microprocessor, controller, or a combination of processors, microprocessor, and/or controllers that performs instructions stored in the volatile 915 or the non-volatile memory 910 to manipulate data stored in the memory. The non-volatile memory 910 can store the processor instructions utilized to configure the processing system 900 to perform processes including processes in accordance with embodiments of the invention and/or data for the processes being utilized. In other embodiments, the processing system software and/or firmware can be stored in any of a variety of non-transient computer readable media appropriate to a specific application. A network interface is a device that allows processing system 900 to transmit and receive data over a network based upon the instructions performed by processor 905. Although a processing system 900 is illustrated in FIG. 9, any of a variety of processing system in the various devices can be configured to provide the methods and systems in accordance with embodiments of the invention can be utilized.

Reinforcement Learning Exploration Process

Figure 10:
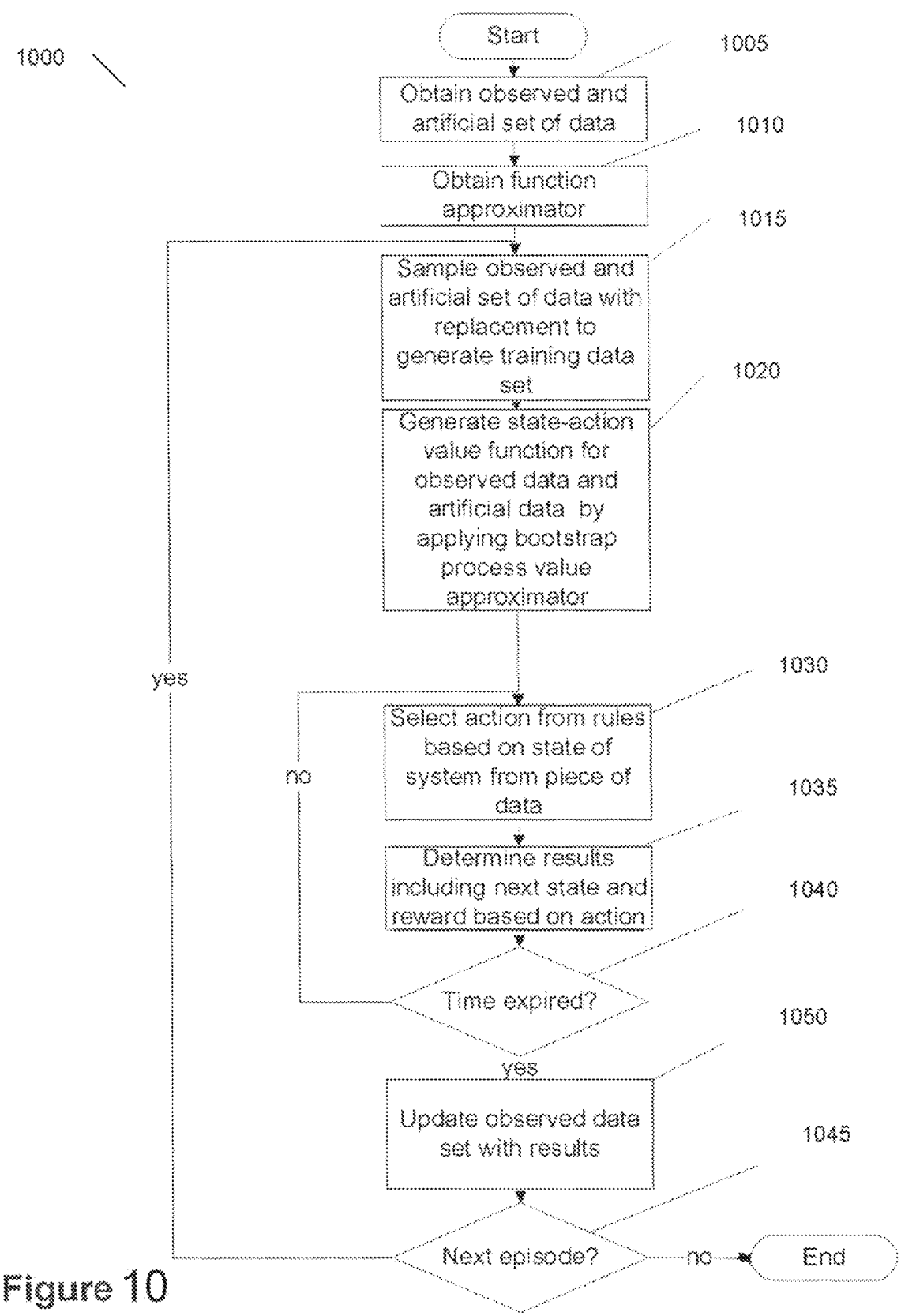
FIG. 10 illustrates a process for providing reinforcement learning in a deep learning network in accordance with an embodiment of the invention.

In accordance with some embodiments of the invention, systems and methods provide reinforcement learning by providing a deep exploration process. The deep exploration process fits a state-action value function to a sample of data from set of data that includes artificial data and observed data. In accordance with some embodiments of the invention, the system receives a set of training data that includes observed data and artificial data. In accordance with some these embodiments, the artificial data is generated by sampling state-action pairs from a diffusely mixed generative model and assign each state-action pair stochastically optimistic rewards and random state transitions. In accordance with some other embodiments, the artificial set of data is generated by sampling the observed set of data with replacement. In accordance with a number of embodiments, the artificial data includes M elements where M is approximately greater than or equal to the number of elements in the observed dataset. The use of the combination of observed and historical data provides randomness in the samples to induce deep learning. An exploration process for providing reinforcement learning to a deep learning network in accordance with an embodiment of this invention is shown in FIG. 10.

Process 1000 performs exploration in M distinct episodes. In accordance with some embodiments, the number of episodes is received as an input and in accordance with some other embodiments the number of episodes may be set or selected by the process based on the size of the deep learning network. A set of data including historical and artificial data is obtained (1005). In the context of our episodic setting, each element of the data set corresponds to a sequence of observations made over an episode. In accordance with some embodiments, the observed data is read from a memory. In accordance with some other embodiments, the observed data is received from another system.

In accordance with some embodiments, the artificial data is generated by sampling the observed data with replacement. In accordance with some other embodiments, the artificial data is generated from the observed data based on a known distribution of the original data. In accordance with some other embodiments, the artificial data is generated independent of the observed data. In accordance with some of these embodiments, the artificial data is generated by sampling state-action pairs from a diffusely mixed generative model; and assigning each state-action pair stochastically optimistic rewards and random state transitions. In accordance with some embodiments, the artificial dataset includes M elements of data where M is approximately equal to or greater than the number of elements in the observed dataset.

An approximator function is also received as input (1010). In accordance with some embodiments, the approximator function may be set for process 1000 and stored in memory for use. The approximator estimates a state-action value function for a data set. In accordance with some embodiments, the approximator function may be a neural network trained to fit a state-action value function to the data set via a least squared iteration. A number of conventional reinforcement learning algorithms would fit the state-action value function to the observed history H. Two key features that distinguish processes in accordance with various embodiments of the invention are that the state-action value function is fit to a random subsample of data and that this subsample is drawn from a combination of historical and artificial data.

The observed and artificial data are sampled to obtain a training set of data (1015). In accordance with some of these embodiments, the training data includes M samples of data. In accordance with a number of these embodiments, M is equal to or greater than a number of episodes to observe. In accordance with some embodiments, the sampling is performed in accordance with a known and/or a provided distribution. A bootstrap process is applied to the union of the observed data and the training data to obtain a new distribution and the approximator function is applied to the distribution to generate a randomized state-value function (1020). For each time step, a state, s, is observed based on the training data and an action, a, is selected based on the state of the system from the sample of data and the policy $\pi$ (1030). The reward, $r_{it}$ realized and resulting transition state, $s_{it+1}$ are observed (1035). The state, s, the action, a, and the resulting transition state, $s_{it+1}$ are stored as resulting data in memory. The selecting (1030) and observing of the results are repeated until the time period ends (1040). The observed set of data is then updated with the results (1050). In accordance with some embodiments, a training mask is maintained that indicates the result data from particular time steps of each episode to add to the observed set of data and the mask is read to determine which elements of the resulting data to add to the observed data. This is then repeated for each of the M episodes (1045) and process 1000 ends.

Although one process for providing reinforcement learning for a deep learning network in accordance with an embodiment of the invention is described with respect to FIG. 10. Other methods that add, removed, and/or combine steps in process 1000 may be performed without departing from the various embodiments of this invention.

Figure 11:
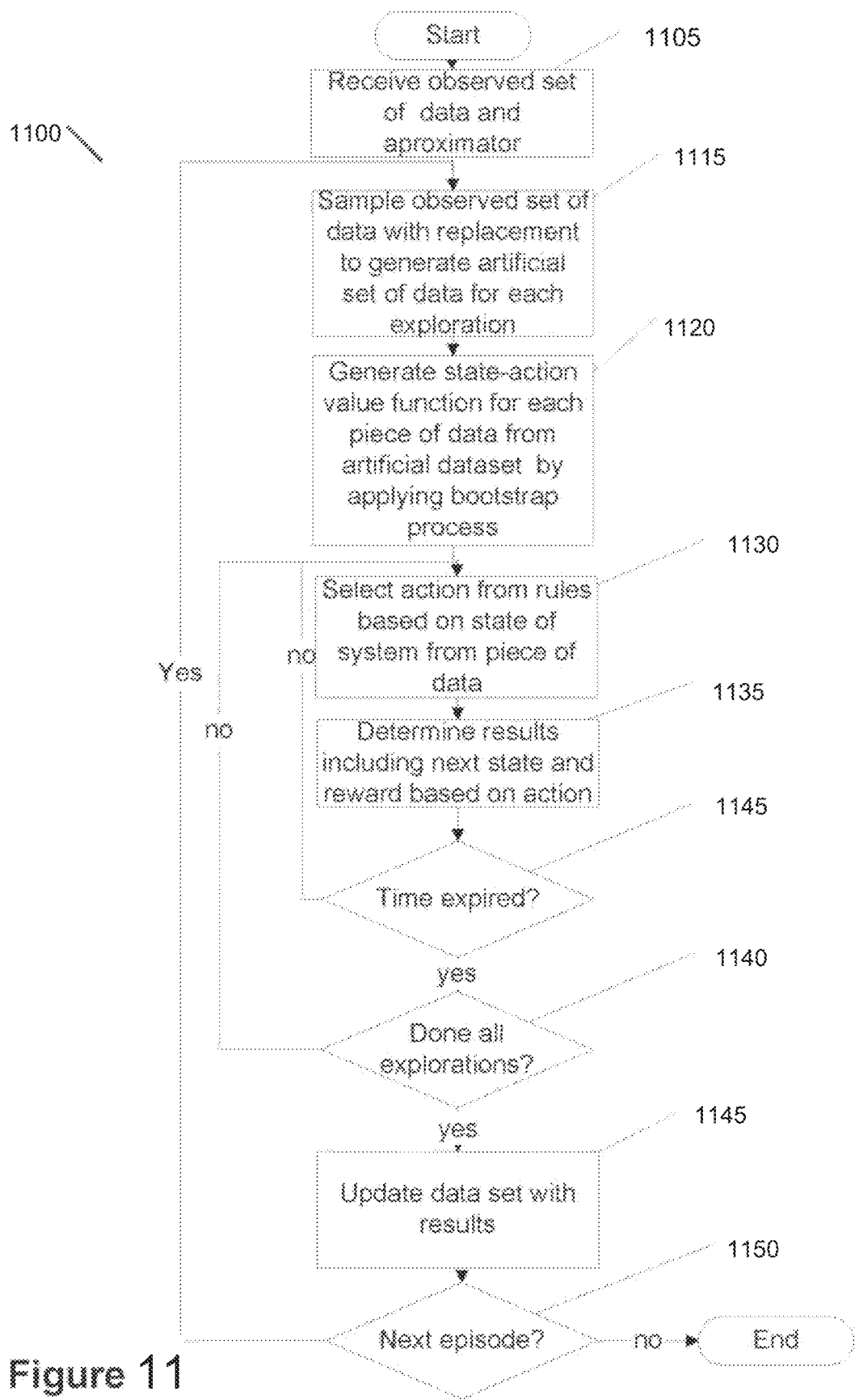
FIG. 11 illustrates an incremental process for providing reinforcement learning in a deep learning network in accordance with an embodiment of the invention.

Fitting a model like a deep neural network is a computationally expensive task. As such, it is desirable to use incremental methods to incorporate new data sample into the fitting process as the data is generated. To do so, parallel computing may be used. A process that performs multiple concurrent explorations in accordance with an embodiment of the invention is shown in FIG. 11.

Process 1100 performs exploration in M distinct episodes for K separate exploration process. In accordance with some embodiments, the number of episodes is received as an input and in accordance with some other embodiments the number of episodes may set or selected by the process based on the size of the deep learning network. A set of data including historical and artificial data is obtained (1105). In accordance with some embodiments, the observed data is read from a memory. In accordance with some other embodiments, the observed data is received from another system.

In accordance with some embodiments, the artificial data for one or more exploration processes is generated by sampling the observed data with replacement. In accordance with some other embodiments, the artificial data for one or more exploration processes is generated from the observed data based on a known distribution of the original data. In accordance with some other embodiments, the artificial data for one or more of the exploration processes is generated independent of the observed data. In accordance with some of these embodiments, the artificial data is generated by sampling state-action pairs from a diffusely mixed generative model; and assigning each state-action pair stochastically optimistic rewards and random state transitions. In accordance with some embodiments, the artificial dataset includes M elements of data where M is approximately equal to or greater than the number of elements in the observed dataset.

An approximator function is also received as input (1105). In accordance with some embodiments, the approximator function may be set for process 1100 and stored in memory for use. The approximator estimates a state-action value function for a data set. In accordance with some embodiments, the approximator function may be a neural network trained to fit a state-action value function to the data set via a least squared iteration. In accordance with some embodiments, 1 to K number of approximators may be used where each of the 1 to K approximators is applied to the training set data of one or more of the K exploration processes.

The observed and artificial data are sampled to obtain a training set of data for each of the K independent processes (1115). In accordance with some of these embodiments, the training data for each exploration process includes M samples of data. In accordance with a number of these embodiments, M is equal to or greater than a number of episodes to observe. In accordance with some embodiments, the sampling for one or exploration processes is performed in accordance with a known and/or a provided distribution. In accordance with some embodiments, one or more of the exploration process may have the same set of artificial data.

For each of the K exploration processes, a bootstrap process is applied to the union of the observed data and the artificial data to obtain a new distribution and the approximator function is applied to the distribution to generate a randomized state-value function (1120). For each exploration process, exploration is performed in the following manner. For each time step, a state, s, is observed and an action, a, is selected based on the state of the system from the sample of data and the policy π (1130). The reward, $r_{lt}$ realized and resulting transition state, $s_{lt+1}$ are observed (1135). The state, s, the action, a, and the resulting transition state, $s_{lt+1}$ are stored as resulting data in memory. The selecting (1130) and observing of the results are repeated until the time period for the episode ends (1140). The observed set of data is individually updated for each exploration process with the results (1150). To do so, a bootstrap mask may be maintained to indicate the observed data that is available to each exploration process. In accordance with some other embodiments, the observed data is updated with the data from all of the different K exploration processes. In accordance with some embodiments, a training mask is maintained that indicates the result data from particular time steps of each episode for each exploration process to add to the observed set of data and the mask is read to determine which elements of the resulting data to add to the observed data. This is then repeated for each of the M episodes (1145) and process 1100 ends.

Although one process for providing reinforcement learning for a deep learning network using multiple exploration processes in accordance with an embodiment of the invention is described with respect to FIG. 11. Other methods that add, removed, and/or combine steps in process 1100 may be performed without departing from the various embodiments of this invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for a reinforcement learning process, the method comprising:
   receiving a set of observed data;
   generating a set of artificial data by:
      sampling a plurality of state-action pairs from a generative model, wherein at least one of the plurality of state-action pairs is generated independent of the set of observed data; and
      assigning each of the plurality of state-action pairs stochastically optimistic rewards and random state transitions;
   performing the following in parallel for each individual approximate state-action value function of a plurality of approximate state-action value functions:
      drawing a bootstrap sample from a combined dataset comprising the set of observed data and the set of artificial data, interpreted as an approximation of Thompson sampling; and
      updating the individual approximate state-action value function based on the approximation of Thompson sampling;

selecting at least one approximate state-action value function from the plurality of approximate state-action value functions, wherein the at least one approximate state-action value function is sampled uniformly from the plurality of approximate state-action value functions;

selecting an action based on a system state and the at least one approximate state-action value function;

determining a result and a transition state for the selected action; and updating the set of observed data with result data that includes the system state, the selected action, the transition state, and the determined result.

2. The method of claim 1, wherein an approximate state-action value function of the at least one approximate state-action value function is a neural network trained to fit a state-action value function to the bootstrap sample via a least squared iteration.

3. The method of claim 1, further comprising:
generating a second set of artificial data;
drawing a second bootstrap sample from the combined dataset; and
determining a second approximate state-action value function based on the second bootstrap sample, wherein selecting the action is further based on the second approximate state-action value function.

4. The method of claim 1, wherein a plurality of iterations is used for at least one of:
selecting the action based on the system state and the at least one approximate state-action value function; or
determining the result and the transition state.

5. The method of claim 1, wherein:
a sequence of time periods is used for:
selecting the action based on the system state and the at least one approximate state-action value function, and
determining the result and the transition state; and
updating the set of observed data includes updating the system state, the selected action, the transition state, and the determined result for the sequence of time periods.

6. The method of claim 5, further comprising maintaining a training mask that indicates the result data from each time period of the sequence of time periods, wherein the updating of the set of observed data comprises adding the result data from each time period of an episode indicated in the training mask.

7. The method of claim 1, wherein the approximation corresponds to Thompson sampling of a posterior distribution, conditioned on the set of observed data.

8. A deep learning system for a reinforcement learning process, the deep learning system comprising:
a set of one or more processors;
memory accessible by the set of one or more processors; and
instructions that, when read, direct the set of one or more processors to:
receive a set of observed data;
generate a set of artificial data by:
sampling a plurality of state-action pairs from a generative model, wherein at least one of the plurality of state-action pairs is generated independent of the set of observed data; and
assigning each of the plurality of state-action pairs stochastically optimistic rewards and random state transitions;

performing the following in parallel for each individual approximate state-action value function of a plurality of approximate state-action value functions:
draw a bootstrap sample from a combined dataset comprising the set of observed data and the set of artificial data, interpreted as an approximation of Thompson sampling; and
update the individual approximate state-action value function based on the approximation of Thompson sampling;
select at least one approximate state-action value function from the plurality of approximate state-action value functions, wherein the at least one approximate state-action value function is sampled uniformly from the plurality of approximate state-action value functions;
select an action based on a system state and the at least one approximate state-action value function;
determine a result and a transition state for the selected action; and
update the set of observed data with result data that includes the system state, the selected action, the transition state, and the determined result.

9. The deep learning system of claim 8, wherein an approximate state-action value function of the at least one approximate state-action value function is a neural network trained to fit a state-action value function to the bootstrap sample via a least squared iteration.

10. The deep learning system of claim 8, wherein the instructions further direct the set of one or more processors to:
generate a second set of artificial data;
draw a second bootstrap sample from the combined dataset; and
determine a second approximate state-action value function based on the second bootstrap sample, wherein selecting the action is further based on the second approximate state-action value function.

11. The deep learning system of claim 8, wherein a plurality of iterations is used for at least one of:
selecting the action based on the system state and the at least one approximate state-action value function, or
determining the result and the transition state.

12. The deep learning system of claim 8, wherein:
a sequence of time periods is used for:
selecting the action based on the system state and the at least one approximate state-action value function, and
determining the result and the transition state; and
updating the set of observed data includes updating the system state, the selected action, the transition state, and the determined result for the sequence of time periods.

13. The deep learning system of claim 12, wherein the instructions further direct the set of one or more processors to maintain a training mask that indicates the result data from each time period of the sequence of time periods, wherein the updating of the set of observed data includes adding the result data from each time period of an episode indicated in the training mask.

14. The deep learning system of claim 8, wherein the approximation corresponds to Thompson sampling of a posterior distribution, conditioned on the set of observed data.

15. A non-transitory computer-readable medium comprising instructions that, when executed, are configured to cause a processor to perform a process for a reinforcement learning, the process comprising:
- receiving a set of observed data;
- generating a set of artificial data by:
  - sampling a plurality of state-action pairs from a generative model, wherein at least one of the plurality of state-action pairs is generated independent of the set of observed data; and
  - assigning each of the plurality of state-action pairs stochastically optimistic rewards and random state transitions;
- performing the following in parallel for each individual approximate state-action value function of a plurality of approximate state-action value functions:
  - drawing a bootstrap sample from a combined dataset comprising the set of observed data and the set of artificial data, interpreted as an approximation of Thompson sampling; and
  - updating the individual approximate state-action value function based on the approximation of Thompson sampling;
- selecting at least one approximate state-action value function from the plurality of approximate state-action value functions, wherein the at least one approximate state-action value function is sampled uniformly from the plurality of approximate state-action value functions;
- selecting an action based on a system state and the at least one approximate state-action value function;
- determining a result and a transition state for the selected action; and
- updating the set of observed data with result data that includes the system state, the selected action, the transition state, and the determined result.

16. The non-transitory computer-readable medium of claim 15, wherein an approximate state-action value function of the at least one approximate state-action value function is a neural network trained to fit a state-action value function to the bootstrap sample via a least squared iteration.

17. The non-transitory computer-readable medium of claim 15, further comprising:
- generating a second set of artificial data;
- drawing a second bootstrap sample from the combined dataset; and
- determining a second approximate state-action value function based on the second bootstrap sample, wherein selecting the action is further based on the second approximate state-action value function.

18. The non-transitory computer-readable medium of claim 15, wherein a plurality of iterations is used for at least one of:
- selecting the action based on the system state and the at least one approximate state-action value function; or
- determining the result and the transition state.

* * * * *